(12) United States Patent
Kanno (10) Patent No.: US 6,366,336 B1
(45) Date of Patent: Apr. 2, 2002

(54) IMAGE FORMING APPARATUS AND METHOD

(75) Inventor: Hiromasa Kanno, Niigata (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/249,376

(22) Filed: Feb. 12, 1999

(30) Foreign Application Priority Data

Feb. 13, 1998 (JP) .......................................... 10-046389

(51) Int. Cl.[7] .............................................. G03B 27/72
(52) U.S. Cl. ...................................................... 355/35
(58) Field of Search ........................... 355/57; 358/298, 358/451, 473, 296; 347/132, 139, 140; 346/107.5; 377/18

(56) References Cited

U.S. PATENT DOCUMENTS

| | | | | |
|---|---|---|---|---|
| 5,164,783 A | * | 11/1992 | Taguchi et al. | 355/327 |
| 5,168,318 A | * | 12/1992 | Haneda et al. | 355/326 |
| 5,319,537 A | * | 6/1994 | Powers et al. | 346/108 |
| 5,473,421 A | * | 12/1995 | Maruyama et al. | 355/326 R |
| 5,473,422 A | * | 12/1995 | Anzai | 355/327 |
| 5,517,230 A | * | 5/1996 | Lofthus et al. | 347/235 |
| 5,579,092 A | * | 11/1996 | Isobe et al. | 355/208 |
| 5,677,724 A | * | 10/1997 | Takizawa et al. | 347/250 |
| 5,754,211 A | * | 5/1998 | Chung | 347/153 |

FOREIGN PATENT DOCUMENTS

| | | |
|---|---|---|
| JP | 61162023 | 7/1986 |
| JP | 62159974 | 7/1987 |
| JP | 62253115 | 11/1987 |
| JP | 63175817 | 7/1988 |
| JP | 3110512 | 5/1991 |
| JP | 5328074 | 12/1993 |

* cited by examiner

*Primary Examiner*—Safet Metjahic
*Assistant Examiner*—Etienne LeRoux
(74) *Attorney, Agent, or Firm*—Ostrolenk, Faber, Gerb & Soffen, LLP

(57) ABSTRACT

An image forming apparatus providing precise image forming is disclosed. A timer is provided to measure a scan time required for a laser beam to move from a first end position to a second end position on a photosensitive belt, the frequency of the timing signal is adjusted depending on the scan time to keep a scan velocity of the laser beam with respect to the frequency of the timing signal at a predetermined constant pixel interval.

44 Claims, 3 Drawing Sheets

LD : LASER
PM : POLYGON MIRROR
M : MOTOR
PD$_L$: START-POINT PHOTODETECTOR
PD$_T$: END-POINT PHOTODETECTOR
D : DEVELOPER UNIT

IMAGE FORMING APPARATUS AND METHOD

BACKGROUND OF THE INVENTION

1. Field of the Invention

The present invention relates to an apparatus and method of forming an image, and, more particularly, to an image forming apparatus which has a laser scanner unit for each color, and an image forming method for that apparatus.

2. Description of the Related Art

Figure 1:
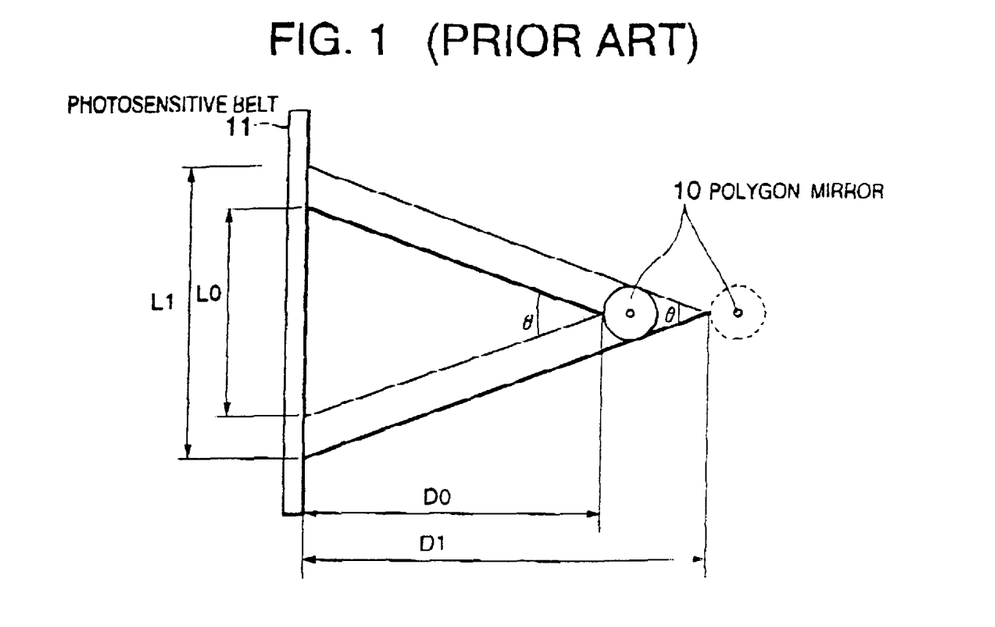
FIG. 1 is a schematic diagram for explaining deviation of a latent image which is formed on a photosensitive belt when the distance between a polygon mirror and the photosensitive belt is shifted.

As shown in FIG. 1, a conventional image forming apparatus which uses a plurality of laser beams is designed in such a way that laser beams reflected at polygon mirrors 10 for individual colors (only one polygon mirror shown in FIG. 1) are irradiated on a photosensitive belt 11. As the polygon mirrors 10 turn, the top surface of the photosensitive belt 11 is scanned with the laser beams irradiated on the photosensitive belt 11, thereby forming a latent image thereon.

To form a distortion-free latent image on the photosensitive bolt 11, an image forming apparatus having a pixel-clock frequency correction means has been disclosed in Japanese Patent Unexamined Publication No. 5-328074. The pixel-clock frequency correction means adjusts the frequency of the pixel clock depending on the scan position of the laser beam to eliminate the distortion of a latent image caused by a variation in distance from the polygon mirror 10 to the surface of the photosensitive belt 11.

However, there are inevitably mounting errors of a laser scanner unit including a laser device, a polygon mirror and an image memory and errors caused by a variation in temperature or the like. Therefore, the distance between the laser scanner unit and the photosensitive belt 11 may vary color by color. This would result in a variation in the laser-beam scan speed at which the laser beam corresponding to each color scans over the photosensitive belt 11. More specifically, the distance between the polygon mirror 10 constituting each laser scanner unit and the photosensitive belt 11, which should be a reference distance D0, may be shifted to a distance D1 due to the mounting error of the polygon mirror 10 or some other factor. In this case, the scan distance of a laser beam over a specific time or a specific scan angle becomes a distance L1 different from a reference distance L0. This means that the latent image formed on the photosensitive belt 11 is shifted from the desired position. Since the distances between the laser scanner units for individual colors and the photosensitive belt 11 differ from each other, the amount of shift varies color by color. This may result in color deviation of a latent image formed on the photosensitive belt 11 by the laser beams of the individual colors.

SUMMARY OF THE INVENTION

Accordingly, it is an object of the present invention to provide an image forming apparatus and method, which can form an image on a photosensitive surface at a precise position.

It is another object of the present invention to provide an image forming apparatus and method, which prevent color deviation of an image formed on a photosensitive surface even when the distance between a laser scanner unit and the photosensitive body differs from the reference one.

According to the present invention, an image forming apparatus includes a timer for measuring a scan time or scan interval required for the laser beam to move from a first end position to a second end position on the photosensitive surface; and an adjuster or compensation circuit for adjusting the frequency of the timing signal depending on (as a function of) the scan time to keep a scan velocity of the laser beam with respect to the frequency of the timing signal at a predetermined constant value.

Since the scan velocity of the laser beam with respect to the frequency of the timing signal is kept constant by adjusting the frequency of the timing signal, an image is formed on the photosensitive surface at a precise position. Therefore, in the case of color image forming, color deviation of the image formed on the photosensitive surface can be eliminated.

The timer preferably operates according to a second timing signal whose frequency is higher than the frequency of the timing signal. Since the higher frequency is used to measure the scan time, the scan time can be measured more precisely.

DETAILED DESCRIPTION OF THE PREFERRED EMBODIMENTS

Preferred embodiments of the present invention will now be described with reference to the accompanying drawings.

Figure 2:
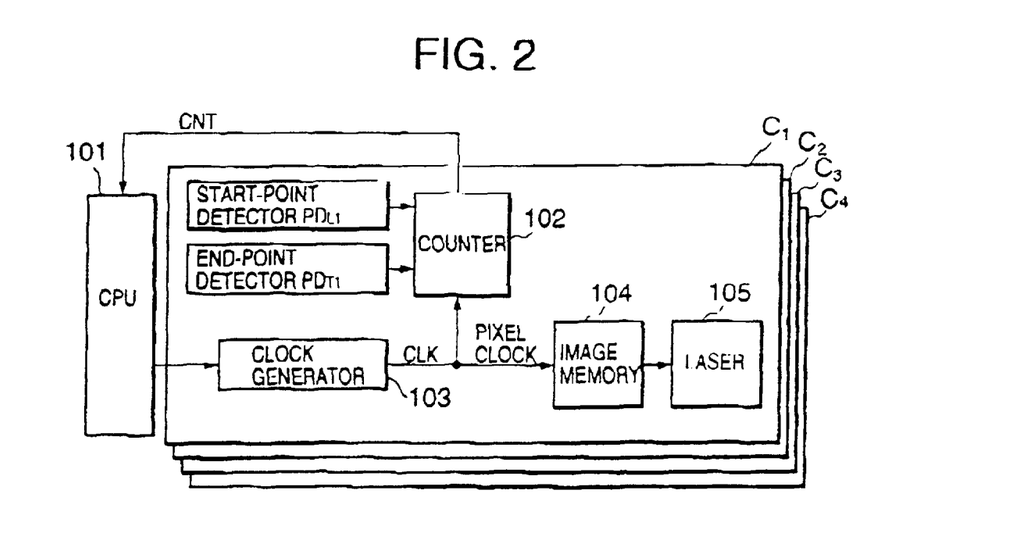
FIG. 2 is a block diagram exemplifying the structure of a laser scanner unit in an image forming apparatus according to a first embodiment of the present invention.

Referring to FIG. 2, laser scanner units $C_1$ to $C_4$ for respective colors are controlled by a central processing unit (CPU) 101. Those laser scanner units $C_1$–$C_4$ basically have the same circuit structure.

For example, the basic structure of the laser scanner unit $C_1$ will now be described. The laser scanner unit $C_1$ has a photodetector $PD_{L1}$ for detecting a start-point opening formed in the leading end of a photosensitive body and a photodetector $PD_{T1}$ for detecting an end-point opening formed in the tailing end of the photosensitive body. As will be discussed later, the start-point detector $PD_{L1}$ detects a laser beam which has passed the start-point opening formed in a photosensitive belt near the leading end at which laser scanning starts, and the end-point detector $PD_{T1}$ detects a laser beam which has passed the end-point opening formed in the photosensitive belt near the tail end at which laser scanning ends. The respective detectors $PD_{L1}$ and $PD_{T1}$ supply predetermined detection signals to a counter 102 that measures a scan time or scan interval.

Under the control of the CPU 101, which functions as a compensation circuit, a clock generator 103 generates a clock signal CLK of a controlled frequency and supplies the clock signal CLK to the counter 102 and as a pixel clock to an image memory 104 for laser beam modulation control which will be discussed later. Based on the clock signal CLK received from the clock generator 103, the counter 102 measures a time difference between a detection signal received from the start-point detector $PD_{L1}$, and a detection signal received from the end-point detector $PD_{T1}$, and sends a signal CNT corresponding to the measured time difference to the CPU 101. Based on the time-difference signal CNT received from the counter 102, the CPU 101 determines the difference between the desired and actual scan times and controls the frequency of the clock signal CLK, which is generated by the clock generator 103.

The image memory 104 stores image data which is used to modulate a laser beam generated by a laser 105 in accordance with the clock signal CLK received from the clock generator 103. In other words, clock signal CLK serves as a modulation control signal so the laser 105 generates the laser beam whose intensity changes depending on the image data supplied from the image memory 104 and with which the photosensitive belt (not shown in this figure) is scanned via an associated polygon mirror to be described later.

Figure 3:
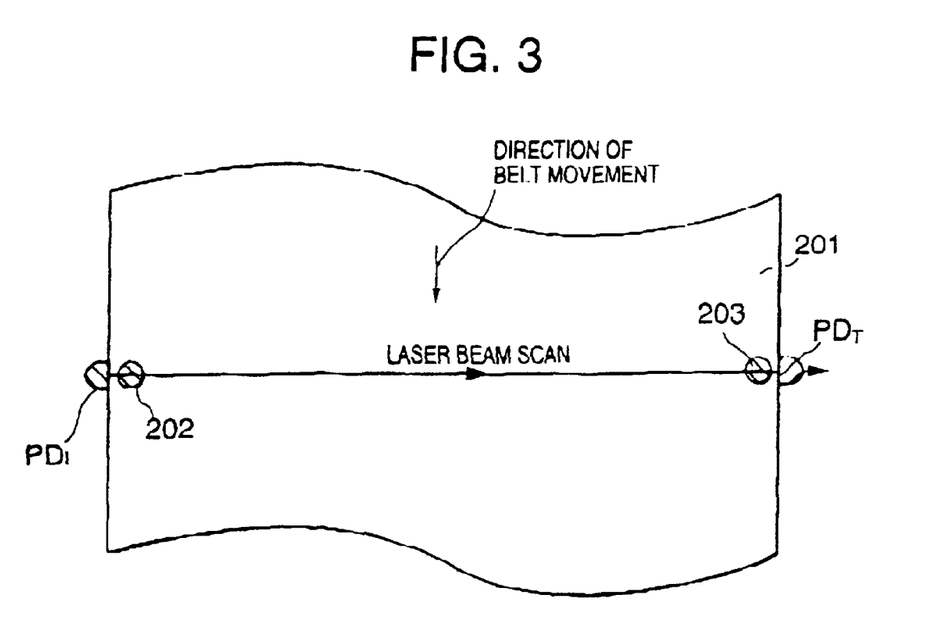
FIG. 3 is a schematic diagram for explaining the positional relationship among openings formed in a photosensitive belt and opening detectors.

As shown in FIG. 3, the start-point detector $PD_{L1}$ is located at a position where a start-point opening 202 formed in a photosensitive belt 201 near the leading end at which laser scanning starts. Therefore, the laser beam that is emitted from the laser 105 passes through the start-point opening 202 and enters the start-point detector $PD_{L1}$. Accordingly, the start-point detector $PD_{L1}$ detects the start-point opening 202. The start-point detector $PD_{L1}$ then supplies an opening detection pulse to the counter 102.

Likewise, the end-point detector $PD_{T1}$ is located at a position where an end-point opening 203 formed in the photosensitive belt 201 near the tail end at which laser scanning ends. The laser beam emitted from the laser 105 therefore passes through the end-point opening 203 and enters the end-point detector $PD_{T1}$. Accordingly, the end-point detector $PD_{T1}$ detects the end-point opening 203. The end-point detector $PD_{T1}$ then supplies an opening detection pulse to the counter 102. In this manner, a pair of the start-point opening 202 and the end-point opening 203 is formed in the photosensitive belt 201.

The counter 102 counts a count value corresponding to a time difference (T2–T1) between a time T1 at which the opening detection pulse from the start-point detector $PD_{L1}$ has been received and a time T2 at which the opening detection pulse from the end-point detector $PD_{T1}$ has been received, based on the clock signal CLK from the clock generator 103 as a reference clock signal. As mentioned above, the clock generator 103 is controlled by the CPU 101 and oscillates at a frequency which is set by the CPU 101. Accordingly, the counter 102 counts the number of clock signals supplied from the clock generator 103 from the time T1 to the time T2, and supplies the count value to the CPU 101.

The CPU 101 compares the count value from the counter 102 with a predetermined specific value i.e., a reference scan interval, to thereby compute the frequency of the clock signal that should be output from the clock generator 103, and sets the frequency value in the clock generator 103 to establish the proper pixel rate as a function of the actual scan interval, as discussed in more detail below. The clock generator 103 generates a clock signal of the frequency set by the CPU 101, and sends the clock signal CLK to the image memory 104.

The image memory 104 outputs image data in accordance with the clock signal output from the clock generator 103. Based on the image data from the image memory 104, the laser 105 is driven to form an image corresponding to the image data on the photosensitive belt 201 as a latent image.

Referring to FIG. 3, the positions of the openings 202 and 203 formed in the photosensitive belt 201, and the locations of the opening detectors $PD_{L1}$ and $PD_{T1}$ will be described. The photosensitive belt 201 is formed of a material which allows a laser beam to pass through nowhere but the openings 202 and 203. The photosensitive belt 201 is driven by a driver unit (not shown) to run in a predetermined direction (secondary scan direction). The laser beam which is emitted from the laser 105 travels in a direction (primary scan direction) perpendicular to the running direction of the photosensitive belt 201.

The start-point opening 202 is formed in the photosensitive belt 201 near the leading end at which laser scanning starts, and the start-point detector $PD_{L1}$ is located at the back of the photosensitive belt 201 as viewed from the laser-beam incident direction and where the start-point opening 202 passes. The end-point opening 203 is formed in the photosensitive belt 201 near the tail end at which laser scanning ends, and the end-point detector $PD_{T1}$ is located at the back of the photosensitive belt 201 as viewed from the laser-beam incident direction and where the end-point opening 203 passes.

Figure 4:
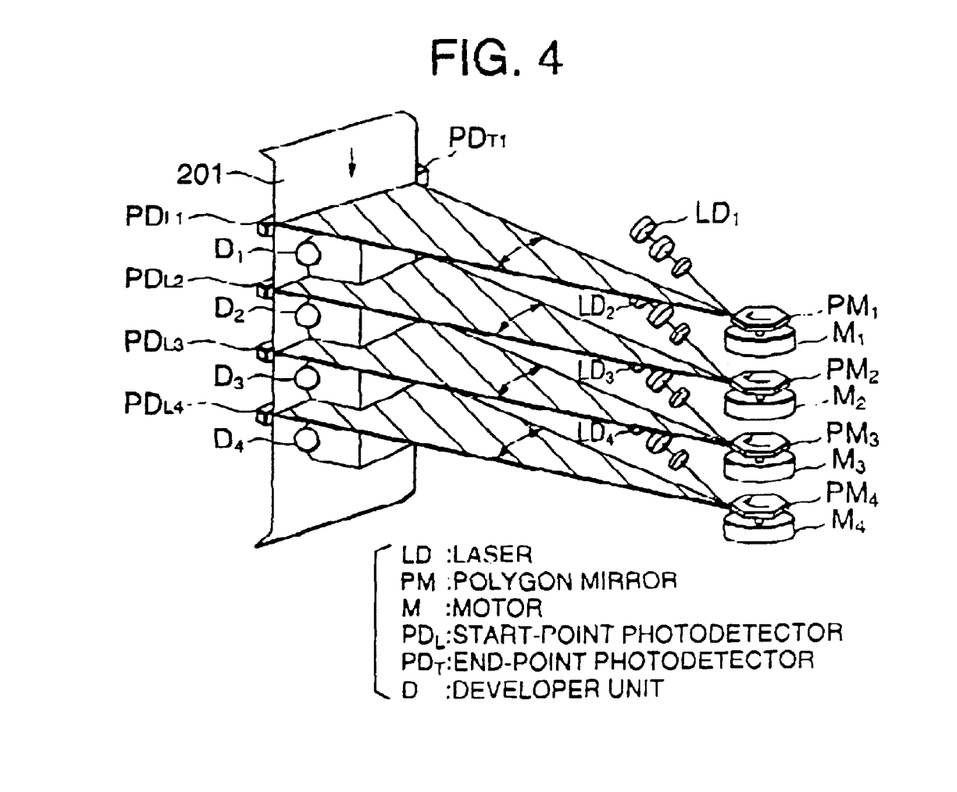
FIG. 4 is a diagram for explaining the arrangement of a photosensitive belt, and laser scanning sections start-point detectors, end-point detectors and developer units all for four colors.

Referring now to FIG. 4, the arrangement of the photosensitive belt 201, and laser scanning sections, start-point detectors $PD_{L1}$ to $PD_{L4}$, end-point detectors $PD_{T1}$ to $PD_{T4}$ and developer units $D_1$ to $D_4$ for all four colors will be described. The laser beams, which are emitted from lasers $LD_1$ to $LD_4$ and correspond to the four colors, are respectively reflected at polygon mirrors $PM_1$ to $PM_4$ for the respective four colors. The polygon mirrors $PM_1$–$PM_4$, each of which has a complete polygonal shape, are rotated at a given angular velocity by motors $M_1$ to $M_4$, respectively. Accordingly, the respective laser beams reflected at the polygon mirrors $PM_1$–$PM_4$ produce laser beam spots moving on the photosensitive belt 201 in the primary scan direction.

The start-point detectors $PD_{L1}$–$PD_{L4}$ and the end-point detectors $PD_{T1}$–$PD_{T4}$ corresponding to the laser beams of the individual colors are located at the positions that have been discussed earlier with reference to FIG. 3. Therefore, the frequency of the clock signal generated by the clock generator 103 is set color by color, and the lasers $LD_1$–$LD_4$ each emit laser beams with intensities corresponding to an image to be formed.

The laser beams of the individual colors, emitted from the lasers $LD_1$–$LD_4$ are irradiated on, and are reflected at, the respective polygon mirrors $PM_1$–$PM_4$, which are rotated in a predetermined direction by the motors (driver units) $M_1$–$M_4$. The laser beams of the individual colors, reflected at the polygon mirrors $PM_1$–$PM_4$, move on the photosensitive belt 201. This scanning with the individual laser beams forms latent images of the individual colors of an intended image on the photosensitive belt 201. The latent images are developed one after another by the respective developer units $D_1$ to $D_4$. A color image is formed on the photosensitive belt 201 in this manner.

Figure 5:
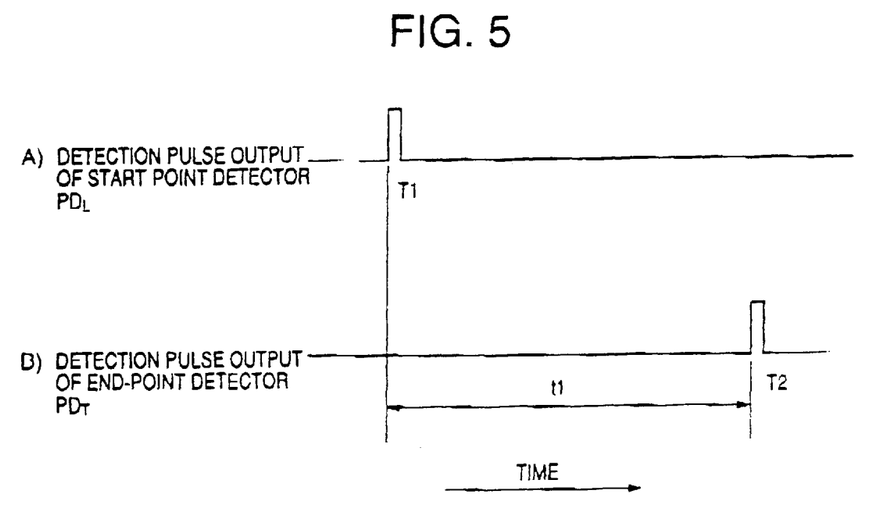
FIG. 5 is a time chart representing a scan time t1 for scanning over the photosensitive body with a laser beam.

Referring to FIG. 5 which shows a time chart, the control operations of the CPU 101 will now be discussed. First, the CPU 101 sets the clock generator for an initial oscillation frequency $f_0$. The counter 102 counts a number of pulses $N_A$ representing an actual scan time $t_1$ between the output time T1 of the opening detection pulse from the start-point detector $PD_{L1}$ and the output time T2 of the opening detection pulse from the end-point detector $PD_{T1}$ based on the clock signal CLK from the clock generator 103 (at frequency $f_0$) as reference clock signal. In other words, time $t_1$ is represented by the relationship $$N_A = f_0 \times t_1 \quad (1)$$

The CPU 101 compares the value $N_A$ counted by the counter 102 with a predetermined reference value $N_R$ to determine the error between time $t_1$ and a desired scan time $t_0$. Again using frequency $f_0$ as a reference, time $t_0$ is represented by the relationship $$N_R = f_0 \times t_0 \quad (2)$$

CPU 101 operates to select a of the clock signal that should be output from the clock generator 103 to compensate for the differences in the color-to-color scan intervals or scan velocities so that the pixel positions are not affected by these differences. This is done by selecting a clock frequency $f_1$ such that $N_R$ is equal to $N_A$. In other words, $$N_A = N_R = f_1 \times t_1 = f_0 \times t_0 \quad (3)$$

Accordingly, $$f_1 = f_0 \times t_0 / t_1 \quad (4)$$

The clock generator 103 generates the clock signal of the frequency f1 in accordance with a frequency control signal representing the clock frequency f1 received from the CPU 101. The clock generator 103 then supplies the clock signal CLK of the controlled frequency f1 to the image memory 104 and the counter 102.

The image memory 104 outputs image data in accordance with the clock signal CLK supplied from the clock generator 103 which functions as the modulation control signal. Based on the image data supplied from the memory 104, the laser 105 is driven to form an image corresponding to the image data on the photosensitive belt 201 as a latent image. With the reference laser-beam scan speed being v0, the actual scan speed, v1, is given by the following equation:

$$v1 = v0 \times t0 / t1 \quad (5)$$

Thus, a distance P between recording pixels can be given by the following equation (6) using the equations (4) and (5). As apparent from the equation (6), the distance P between recording pixels is constant.

$$P = v1/f1 = v0/f0 \quad (6)$$

Thus, a distance P between recording pixels can be given by the following equation (3) using the equations (1) and (2). As apparent from the equation (3), the distance P between recording pixels is constant.

$$p = v1/f1 = v0/f0 \quad (3)$$

This means that the latent image of desired image data can be formed at the desired position on the photosensitive belt.

Each laser scanner unit incorporates a reference sensor (not shown) which detects the laser beam that has been reflected at the associated polygon mirror. This reference sensor outputs a reference pulse (horizontal sync signal=BD signal) which represents a record-starting position on the photosensitive belt. Those reference sensors of the individual colors are mounted at the same positions in the individual laser scanner units.

The time from the point when this BD signal has been output to the point when a predetermined number N has been counted based on the clock signal CLK generated by the clock generator 103. As mentioned above, the oscillation frequency of the clock generator 103 is given by the equation (1) and is computed for each color. By writing an image for each color at the timing when the same value N is counted, therefore, positions for starting drawing latent images of the individual colors on the photosensitive belt can be matched with one another.

Therefore, even if the respective distances between the laser scanner units and the photosensitive belt 201 vary color by color due to a mounting error and a variation in temperature or the like, making the scan speeds of the laser beams of the individual colors on the photosensitive belt 201 differ from one another, the latent image of desired image data can be formed at the desired position on the photosensitive belt 201 by performing the above-described process color by color.

If the difference between the time t0 and the time t1 which has been measured for a specific one of the four colors falls within a tolerance, the controlled frequency f1 for the other three colors may be computed by treating the time t1 as the time t0. This is because if the difference between the time t1 and the time t0 falls within a tolerance, the distance P between recording pixels given by the equation (3) does not take an absolute value, but the values for the four colors may relatively match with one another.

Figure 6:
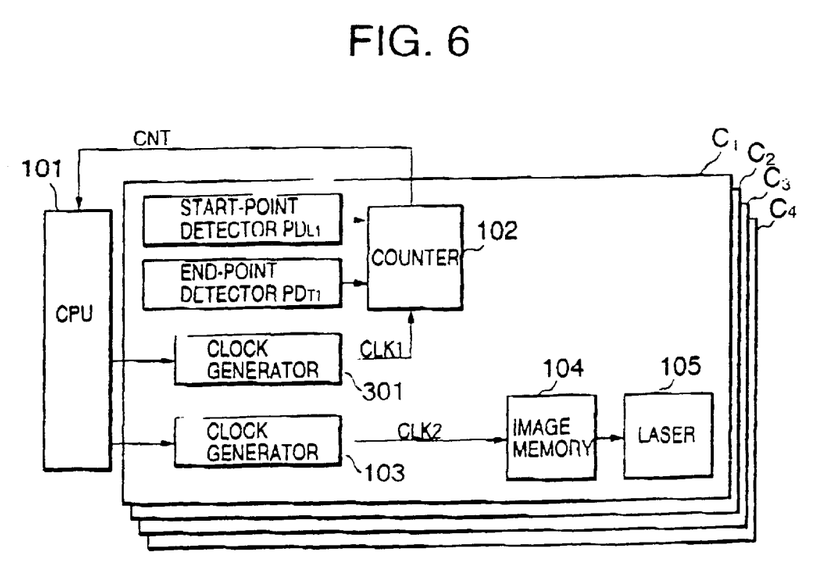
FIG. 6 is a block diagram exemplifying the structure of a laser scanner unit in an image forming apparatus according to another embodiment of this invention.

FIG. 6 shows an image forming apparatus according to a second embodiment of the present invention, wherein circuit blocks similar to those previously described with reference to FIG. 2 are denoted by the same reference numerals.

According to the second embodiment, an additional clock generator 301 is provided exclusively for the counter 102 and is connected to the counter 102. As a result, a clock signal $CLK_1$ generated by the clock generator 301 is supplied to the counter 102. Based on the clock signal $CLK_1$ received from the clock generator 301, the counter 102 measures a time difference L1 between the time at which the opening detection pulse is supplied from the start-point detector $PD_{L1}$ and the time at which the opening detection pulse is supplied from the end-point detector $PD_{T1}$.

The frequency of the output clock $CLK_1$ of the clock generator 301 is set to be higher than the frequency of the output clock $CLK_2$ of the clock generator 103 as shown in FIG. 2. This can allow the counter 102 to more accurately measure the time difference t1 between the output time of the opening detection pulse from the start-point detector $PD_{L1}$ and the output time of the opening detection pulse from the end-point detector $PD_{T1}$. Therefore, the latent image of desired image data can be formed at the desired position on the photosensitive belt at high precision.

With this structure, even if the distances between the laser scanner units and the photosensitive belt 201 vary color by color due to a mounting error and a variation in temperature or the like, making the scan speeds of the laser beams of the individual colors on the photosensitive belt 201 differ from one another, the latent image of desired image data can be formed at the desired position on the photosensitive belt 201. In other words, it is possible to prevent color deviation which may occur due to a variation in the scan speeds of the laser beams of the individual colors on the photosensitive belt 201. Therefore, an image having a high quality with no color deviation can be obtained by scanning the photosensitive belt with the laser beams of the individual colors and then developing the latent image on the photosensitive belt.

According to an image forming apparatus and method according to the present invention, a scan time required for a laser beam with which a photosensitive body is scanned to scan between a first point on one end portion of the photosensitive body and a second point on the other end thereof is measured, and the frequency of a clock signal is adjusted in accordance with the measured scan time. Even when the scan speeds of the laser beams of the individual colors on the photosensitive body differ from one another, therefore, the latent image of image data of a desired size can be formed at a desired position on the photosensitive body with high precision.

Although only two embodiments of the present invention have been described herein, it should be apparent to those skilled in the art that the present invention may be embodied in many other specific forms without departing from the spirit or scope of the invention. Therefore, the present embodiments are to be considered as illustrative and not restrictive and the invention is not to be limited to the details given herein, but may be modified within the scope of the appended claims.

What is claimed is:

1. An apparatus for forming an image on a photosensitive surface by scanning the photosensitive surfaced with a laser beam modulated at an adjustable pixel rate in accordance with data representing the image, the apparatus comprising:

a modulation control signal generator which establishes the pixel rate;

a beam scanner for scanning the laser beam repeatedly across the photosensitive surface in a first direction to create a succession of lines of the image as the photosensitive surface is moved in a second direction;

a first timing signal generator which generates a first timing signal when the laser beam illuminates a first position representing the beginning of each scan across the photosensitive surface;

a second timing signal generator which generates a second timing signal when the laser beam illuminates a second position representing the end of each scan across the photosensitive surface, the interval between the first and second timing signals corresponding to the time required for the laser beam to scan from the first position to the second position;

a scan interval signal generator which generates a scan interval signal representing the actual interval between the first and second timing signals;

a comparison circuit which determines the difference between the actual scan interval and a reference scan interval value corresponding to the desired time for the modulated laser beam to scan from the first position to the second position; and a compensation circuit which adjusts the output of the modulation control signal generator to vary the pixel rate of the modulated beam as a function of the difference.

2. The apparatus according to claim 1, wherein:

the output of the modulation control signal generator is a series of pulses, the pulse frequency corresponding to the pixel rate;

the scan interval signal generator counts the number of modulation control signal pulses between the first and the second timing signals; and the compensation circuit is operative to adjust the pulse frequency of the modulation control signal generator.

3. The apparatus according to claim 1, further comprising:

a clock signal generator which generates a series of pulses at a frequency which is higher that the pixel rate; and wherein the output of the modulation control signal generator is a series of pulses, the pulse frequency corresponding to the pixel rate;

the scan interval signal generator counts the number of clock signal pulses between the first and the second timing signals; and the compensation circuit is responsive to the error signal to adjust the pulse frequency of the output of the modulation control signal.

4. The apparatus according to claim 1, wherein the compensation circuit adjusts the pixel rate according to the relationship:

$$f_1 = f_0 \times t_0 / t_1$$

where $f_0$ is an initial pixel rate, $t_0$ is the reference scan interval, and $t_1$ is the scan interval between the first and second timing signals.

5. The apparatus according to claim 1, wherein the pixel rate is adjusted so that the distance between adjacent pixels of the image is maintained constant, irrespective of variations in the scan interval between the first and second timing signals.

6. The apparatus according to claim 1, wherein:

the first timing signal generator comprises a first optical detector located at the first position which generates the first timing signal when it is illuminated by the laser beam;

the second timing signal generator comprises a second optical detector located at the second position which generates the second timing signal when it is illuminated by the laser beam; and the scan interval signal generator counts a number of pulses generated by a pulse generator between the first and second timing signals.

7. The apparatus according to claim 6, wherein:

the photosensitive surface has a first opening therein at the first position and a second opening therein at the second position; and the first and second detectors are positioned to detect the laser beam passing through the respective openings.

8. The apparatus according to claim 6, wherein the pulse generator is the modulation control signal generator.

9. The apparatus according to claim 6, wherein the pulse generator is a clock signal generator which generates a series of pulses at a frequency which is higher that the pixel rate.

10. A method for forming an image on a photosensitive surface by scanning the photosensitive surface with a laser beam, modulated at an adjustable pixel rate in accordance with data representing the image, the method comprising:

generating a modulation control signal at a frequency corresponding to a selected pixel rate;

scanning the laser beam repeatedly across the photosensitive surface in a first direction as the photosensitive surface is moved in a second direction;

generating a scan interval signal representing time required for the laser beam to scan from a first edge of the photosensitive surface to a second edge across the photosensitive surface;

determining the difference between the scan interval represented by the scan interval signal and a signal representing a predetermined reference scan interval;

adjusting the pixel rate as a function of the difference to compensate for the effect of the difference on the image; and modulating the laser beam under control of the modulation control signal.

11. The method according to claim 10, wherein the step of generating the scan interval signal comprises:

generating a first timing signal when the scanning laser beam illuminates the first edge of the photosensitive surface;

generating a second timing signal when the scanning laser beam illuminates the second edge of the photosensitive surface;

providing a series of clock pulses;

counting the number of clock pulses between the first and the second timing signals; and generating the scan interval signal according to the number of clock pulses counted.

12. The method according to claim 11, wherein the step of providing a series of clock pulses comprises generating a clock signal at a fixed frequency higher than the pixel rate.

13. The method according to claim 11, wherein the step of providing a series of clock pulses comprises coupling the modulation control signal to a counter which is activated by the first timing signal and deactivated by the second timing signal.

14. The method according to claim 10, wherein the step of adjusting the pixel rate comprises selecting the pixel rate according to the relationship:

$$f_1 = f_0 \times t_0 / t_1$$

where f0 is an initial pixel rate, $t_0$ is a reference scan interval, and $t_1$ is the actual scan interval.

15. The method according to claim 10, wherein the pixel rate is adjusted so that the distance between adjacent pixels of the image is maintained constant, irrespective of variations in the actual scan interval.

16. An apparatus for forming a color image comprised of a plurality of color separation images on a photosensitive surface of a belt by scanning the photosensitive surface with a plurality of laser beams each modulated at an adjustable pixel rate in accordance with data representing one of the color separation images, the apparatus comprising:

a plurality of modulation control signal generators which establish the pixel rates for the respective color separation images;

a plurality of beam scanners which scan the respective laser beam repeatedly across the photosensitive surface in a first direction to create the color separation images in the form of a succession of lines for each of the color separation images as the belt is moved in a second direction;

a plurality of first timing signal generators which generate first timing signals when the respective laser beams illuminate a first position representing the beginning of each scan across the photosensitive surface;

a plurality of second timing signal generators which generate second timing signals when the respective laser beams illuminate a second position representing the end of each scan across the photosensitive surface, the intervals between the first and second timing signals representing the time required for the respective laser beams to scan from the first positions to the second positions;

a plurality of scan interval signal generators which generate scan interval signals representing the respective intervals between the first and second timing signals; and a plurality of comparison circuits which determine the differences between the actual scan intervals and reference scan intervals corresponding to the desired times for the modulated laser beams to scan from the first position to the second position; and a plurality of compensation circuits which adjust the outputs of the modulation control signal generators to vary the pixel rates of the modulated beams for each color separation image as a function of the respective differences.

17. The apparatus according to claim 16, wherein:

each modulation control signal is a series of pulses, the pulse frequency corresponding to the pixel rate for the respective color separation images;

the scan interval signal generators count the number of modulation control signal pulses between the first and the second timing signals for the respective color separation images; and the compensation circuits are operative to adjust the pulse frequency of the respective modulation control signals.

18. The apparatus according to claim 16, further comprising:

a clock signal generator which generates a series of pulses at a frequency which is higher that the pixel rates; and wherein each modulation control signal is a series of pulses, the pulse frequency corresponding to the pixel rate;

the scan interval signal generators count the number of clock signal pulses between the first and the second timing signals for the respective color separation images; and the compensation circuits are responsive to the error signals to adjust the pulse frequency of the respective modulation control signals.

19. The apparatus according to claim 16, wherein the compensation circuits adjust the pixel rates according to the relationship:

$$f_1 = f_0 \times t_0 / t_1$$

where the values of $f_0$ are initial pixel rates for each color separation image, the values of $t_0$ are reference scan intervals, and the values of $t_1$ are the actual scan intervals between the respective first and second timing signals.

20. The apparatus according to claim 16, wherein the respective pixel rates are adjusted so that the distances between adjacent pixels of all the color separation images are maintained constant, irrespective of variations in the scan intervals.

21. The apparatus according to claim 16, wherein:

each first timing signal generator comprises a first optical detector located at the first position which generates the first timing signal when it is illuminated by the respective laser beam;

each second timing signal generator comprises a second optical detector located at the second position which generates the second timing signal when it is illuminated by the respective laser beam; and each scan interval signal generator counts a number of pulses generated by a pulse generator between the respective first and second timing signals.

22. The apparatus according to claim 21, wherein the pulse generator is the modulation control signal generator.

23. The apparatus according to claim 21, wherein the pulse generator is a clock signal generator which generates a series of pulses at a frequency which is higher than the pixel rates.

24. The apparatus according to claim 23 further including a separate clock signal generator for each color separation image.

25. A method for forming a color image comprised of a plurality of color separation images on a photosensitive surface by scanning the photosensitive surface with a plurality of laser beams, each beam modulated at an adjustable pixel rate in accordance with data representing one of the color separation images, the method comprising the steps of:
generating a plurality of modulation control signals at frequencies corresponding to selected pixel rates for each color separation image;
scanning the laser beams repeatedly across the photosensitive surface in a first direction as the photosensitive surface is moved in a second direction;
generating a plurality of scan interval signals representing time required for the respective laser beams to scan from a first edge of the photosensitive surface to a second edge across the photosensitive surface;
determining the difference between the scan interval represented by the scan interval signal and a signal representing a predetermined reference scan interval for each color separation image;
adjusting the pixel rates as a function of the respective differences to compensate for the effect of the difference on each color separation image; and
modulating the laser beam under control of the respective modulation control signals.

26. The method according to claim 25, wherein the step of generating the scan interval signals comprises:
generating a first timing signal when each scanning laser beam illuminates the first edge of the photosensitive surface;
generating a second timing signal when each scanning laser beam illuminates the second edge of the photosensitive surface;
providing a series of clock pulses;
counting the number of clock pulses between the respective first and the second timing signals; and
generating the scan interval signals according to the respective number of clock pulses counted.

27. The method according to claim 26, wherein the step of providing a series of clock pulses comprises generating a clock signal at a fixed frequency higher than the pixel rate.

28. The method of claim 27, wherein a separate series of clock pulses is generated for each color separation image.

29. The method according to claim 27, wherein the step of providing a series of clock pulses comprises coupling the modulation control signals to a plurality of counters which are respectively activated by the first timing signals and deactivated by the second timing signals for each color separation.

30. The method according to claim 25, wherein the step of adjusting the pixel rates comprises selecting the pixel rates according to the relationship:

$$f_1 = f_0 \times t_0 / t_1$$

where the values of $f_0$ are initial pixel rates for each color separation images, the values of $t_0$ are reference scan intervals, and the values of $t_1$ are the respective actual scan intervals for each color separate image.

31. The method according to claim 25, wherein the pixel rates are adjusted so that the distances between adjacent pixels of the color separation images are maintained constant, irrespective of variations in the respective scan intervals.

32. The image forming method according to claim 25, wherein of each of the pixel rates are separately adjusted.

33. An apparatus for forming an image on a photosensitive surface by scanning the photosensitive surface with a laser beam modulated at an adjustable pixel rate in accordance with data representing the image, the apparatus comprising:
a modulation control signal generator which establishes the pixel rate;
a beam scanner for scanning the laser beam repeatedly across the photosensitive surface in a first direction at a substantially fixed scanning velocity to create a succession of lines of the image as the photosensitive surface is moved in a second direction; and
a subsystem for compensating for differences between the substantially fixed scanning velocity and a desired scanning velocity, the subsystem being comprised of:
a first timing signal generator which generates a first timing signal when the laser beam illuminates a first position representing the beginning of each scan across the photosensitive surface;
a second timing signal generator which generates a second timing signal when the laser beam illuminates a second position representing the end of each scan across the photosensitive surface, the interval between the first and second timing signals corresponding to the time required for the laser beam to scan from the first position to the second position;
a scan interval signal generator which generates a scan interval signal representing the actual interval between the first and second timing signals;
a comparison circuit which determines the difference between the actual scan interval and a reference scan interval value corresponding to the desired time for the modulated laser beam to scan from the first position to the second position; and
a compensation circuit which adjusts the output of the modulation control signal generator to vary the pixel rate of the modulated beam as a function of the difference.

34. The apparatus according to claim 33, wherein the compensation circuit adjusts the pixel rate according to the relationship:

$$f_1 = f_0 \times t_0 / t_1$$

where $f_0$ is an initial pixel rate, $t_0$ is the reference scan interval, and $t_1$ is the scan interval between the first and second timing signals.

35. The apparatus according to claim 33, wherein the pixel rate is adjusted so that the distance between adjacent pixels of the image is maintained constant, irrespective of variations in the scan interval between the first and second timing signals.

36. A method for forming an image on a photosensitive surface by scanning the photosensitive surface with a laser beam, modulated at an adjustable pixel rate in accordance with data representing the image, the method being comprised of:
generating a modulation control signal at a frequency corresponding to a selected pixel rate;
scanning the laser beam repeatedly across the photosensitive surface in a first direction at a substantially fixed scanning velocity as the photosensitive surface is moved in a second direction; and
compensating for differences between the substantially fixed scanning velocity and a predetermined desired scanning velocity by:

generating a scan interval signal representing time required for the laser beam to scan from a first edge of the photosensitive surface to a second edge across the photosensitive surface;

determining the difference between the scan interval represented by the scan interval signal and a signal representing a predetermined reference scan interval;

adjusting the pixel rate as a function of the difference to compensate for the effect of the difference on the image; and modulating the laser beam under control of the modulation control signal.

37. The method according to claim 36, wherein the step of adjusting the pixel rate comprises selecting the pixel rate according to the relationship:

$$f_1 = f_0 \times t_0 / t_1$$

where $f_0$ is an initial pixel rate, $t_0$ is a reference scan interval, and $t_1$ is the actual scan interval.

38. The method according to claim 36, wherein the pixel rate is adjusted so that the distance between adjacent pixels of the image is maintained constant, irrespective of variations in the actual scan interval.

39. An apparatus for forming a color image comprised of a plurality of color separation images on a photosensitive surface of a belt by scanning the photosensitive surface with a plurality of laser beams in accordance with data representing one of the color separation images, the apparatus comprising:

a plurality of modulation control signal generators which establish the pixel rates for the respective color separation images;

a plurality of beam scanners which scan the respective laser beams repeatedly across the photosensitive surface in a first direction at substantially fixed scanning velocities to create the color separation images in the form of a succession of lines for each of the color separation images as the belt is moved in a second direction; and a plurality of subsystems for compensating for differences between the respective scanning velocities and a desired scanning velocity, the subsystem being comprised of:

a plurality of first timing signal generators which generate first timing signals when the respective laser beams illuminate a first position representing the beginning of each scan across the photosensitive surface;

a plurality of second timing signal generators which generate second timing signals when the respective laser beams illuminate a second position representing the end of each scan across the photosensitive surface, the intervals between the first and second timing signals representing the time required for the respective laser beams to scan from the first positions to the second positions;

a plurality of scan interval signal generators which generate scan interval signals representing the respective intervals between the first and second timing signals; and a plurality of comparison circuits which determine the differences between the actual scan intervals and a reference scan intervals corresponding to the desired time for the modulated laser beams to scan from the first position to the second position; and a plurality of compensation circuits which adjust the outputs of the modulation control signal generators to vary the pixel rates of the modulated beams for each color separation image as a function of the respective differences.

40. The apparatus according to claim 39, wherein the compensation circuits adjust the pixel rates according to the relationship:

$$f_1 = f_0 \times t_0 / t_1$$

where the values of $f_0$ are initial pixel rates for each color separation image, the values of $t_0$ are reference scan intervals, and the values of $t_1$ are the actual scan intervals between the respective first and second timing signals.

41. The apparatus according to claim 39, wherein the respective pixel rates are adjusted so that the distances between adjacent pixels of all the color separation images are maintained constant, irrespective of variations in the scan intervals.

42. A method for forming a color image comprised of a plurality of color separation images on a photosensitive surface by scanning the photosensitive surface with a plurality of laser beams, each beam modulated at an adjustable pixel rate in accordance with data representing one of the color separation images, the method comprising the steps of:

generating a plurality of modulation control signals at frequencies corresponding to selected pixel rates for each color separation image;

scanning the laser beams repeatedly across the photosensitive surface in a first direction at substantially fixed scanning velocities as the photosensitive surface is moved in a second direction;

generating a plurality of scan interval signals representing time required for the respective laser beams to scan from a first edge of the photosensitive surface to a second edge across the photosensitive surface;

compensating for differences between the actual scanning velocities of the laser beams and a predetermined desired scanning velocity by:

determining the differences between the scan intervals represented by the scan interval signal and a signal representing a predetermined reference scan interval;

adjusting the pixel rates as a function of the respective differences to compensate for the effect of the difference on each color separation image; and modulating the laser beam under control of the respective modulation control signals.

43. The method according to claim 42, wherein the step of adjusting the pixel rates comprises selecting the pixel rates according to the relationship:

$$f_1 = f_0 \times t_0 / t_1$$

where the values of $f_0$ are initial pixel rates for each color separation images, the values of $t_0$ are reference scan intervals, and the values of $t_1$ are the respective actual scan intervals for each color separate image.

44. The method according to claim 42, wherein the pixel rates are adjusted so that the distances between adjacent pixels of the color separation images are maintained constant, irrespective of variations in the respective scan intervals.

* * * * *